United States Patent [19]

Tanaka et al.

[11] Patent Number: 4,907,447
[45] Date of Patent: Mar. 13, 1990

[54] APPARATUS FOR MARKING HIGH POINT MARK ON TIRE

[75] Inventors: Masami Tanaka; Masataka Nagasawa, both of Kodaira, Japan

[73] Assignee: NEC Corporation, Tokyo, Japan

[21] Appl. No.: 195,065

[22] Filed: May 17, 1988

[30] Foreign Application Priority Data

May 20, 1987 [JP] Japan .................. 62-121009

[51] Int. Cl.⁴ .......................... E01C 23/00
[52] U.S. Cl. ........................ 73/146
[58] Field of Search ................ 73/146

[56] References Cited

U.S. PATENT DOCUMENTS 3,911,739 10/1975 Morafa et al. ............ 73/146
4,359,897 11/1982 Ugo ........................ 73/146

FOREIGN PATENT DOCUMENTS 47-28843 7/1972 Japan .
50-97411 8/1975 Japan .

OTHER PUBLICATIONS

Instruction Manual, Mitsubishi Sequencer, 1961.

Primary Examiner—Donald O. Woodie
Attorney, Agent, or Firm—Sughrue, Mion, Zinn, Macpeak & Seas

[57] ABSTRACT

In an apparatus for marking a high point mark on a sidewall of tire at a peak position of a primary waveform of RFV of the tire, the position of tire to be stopped is controlled by an AC servo controller, so that the process of marking can be effected preciously and speedy.

7 Claims, 3 Drawing Sheets

APPARATUS FOR MARKING HIGH POINT MARK ON TIRE

BACKGROUND OF THE INVENTION

Field of the Invention and Related Art Statement

This invention relates to an apparatus for marking a high point mark on a sidewall of a tire at a peak position of a primary waveform of a radial force variation (RFV) of the tire.

In order to make performance of tires high, a tire uniformity has to be improved. As one of the means for improving this tire uniformity, it is effective to buff the tire selectively to decrease the RFV of the tire, which means the peak-peak value of the variation of the radial force of tire during one complete rotation of tire.

However, radial runout is generally generated on a bead seat of wheel. Thus, there is an effective method to improve the RFV of tire as a whole which is to make the bottom of valley of the primary waveform of the radial runout of the wheel coincident with the peak point of the primary waveform of RFV of the tire, which was measured by setting the relevant tire on a standard rim having a radial runout preciously decreased. For the sake of making such improvement on the tire, it is necessary to detect the peak position of the primary waveform of RFV of the tire and a high point mark should be recorded upon said peak position, for example, by thermoprinting. Therefore, the conventional marking apparatus for tires has been designed such that a rotating amount of an electric motor for rotating a spindle on which a standard rim is arranged is controlled so that the peak position of RFV of the tire is stopped at the predetermined marking position.

FIG. 1 is a graph showing a manner of controlling rotating velocity of an electric motor in the conventional marking apparatus. As shown in FIG. 1, the tire is rotated at a constant velocity $V_0$ until the time $t_1$. The peak position of RFV of the tire forms a predetermined angle with the marking point at the time $t_1$. Thereafter, the rotating velocity of the tire is gradually decreased until the time $t_2$ and then remains at a constant lower velocity $V_L$ until the time $t_3$. After the time $t_3$, the rotating velocity of the tire is gradually decreased again and the tire is stopped at the time of $t_4$.

In the above-mentioned conventional method for controlling the rotating amount of the electric motor, the rotation of tire is controlled from the instant $t_1$ that the peak point of RFV of the tire comes to the position forming a predetermined angle with the marking position until the time $t_4$ that the peak point of RFV of the tire comes at the marking position That is to say, just after the time $t_1$, the rotating velocity of tire is reduced to the lower velocity VL and the final reduction of the rotating velocity starts from the time $t_3$. Therefore, the tire rotates at the lower velocity for 3~5 seconds on average, and the processing time for marking is so long and the processing efficiency is low.

It can be considered to make the lower rotating velocity $V_L$ higher in order to shorten the processing time per one tire. But, in this case, it will be difficult to stop the tire at the desired position in a precise manner. Further, if the tire runs over the desired position, it would be necessary to rotate the tire in the reverse direction, as a result, the whole time for processing might becomes too long.

Furthermore, in the conventional marking apparatus for tires, the rotating velocity of tires is controlled with the aid of pulses each of which is derived when the tire is rotated over an angle of 360/128, i.e. 2.8°. Thus, there is a disadvantage that the tire stops at the desired position with only the precision of 2.8°. This precision is too low to effect the desired control.

SUMMARY OF THE INVENTION

The present invention has for its object to provide an apparatus for marking a high point mark on a sidewall of a tire at a peak position of a primary waveform of a radial force variation (RFV) of the tire comprises rotating means for rotating a tire;

processing means for generating first pulses the number of which corresponds to an angle over which said tire must be rotated from a reference position on the tire to the peak position of RFV;

pulse generating means for generating second pulses having a frequency in accordance with a rotating velocity of the tire rotated by said rotating means;

servo controlling means comprising a counter for counting said first pulses supplied from said processing means and second pulses supplied from said pulse generating means to produce a count value which is a difference between count values of said first and second pulses, a digital/analogue converter for converting the count value produced by said counter to an analogue signal, and a servo amplifier for receiving said analogue signal to produce a direct current voltage having an amplitude which is proportional to an amplitude of said analogue signal, and said direct current voltage being applied to said rotating means; and marking means for marking a high point mark at the peak position of RFV on the sidewall of the tire which is stopped when said count value of the counting means becomes zero.

In the above-mentioned marking apparatus according to the present invention, since the automatic servo controller is used for controlling the position at which the tire must be stopped, it is no more necessary to maintain the rotating velocity of the tire at the lower value and the rotation speed can be gradually decreased from the start until the tire is actually stopped. Therefore, the time for the marking process can be largely shortened. Further, the tire can be stopped at the desired marking position very precisely with the precision of, for example 0.1°.

DETAILED DESCRIPTION OF PREFERRED EMBODIMENT

Figure 1:
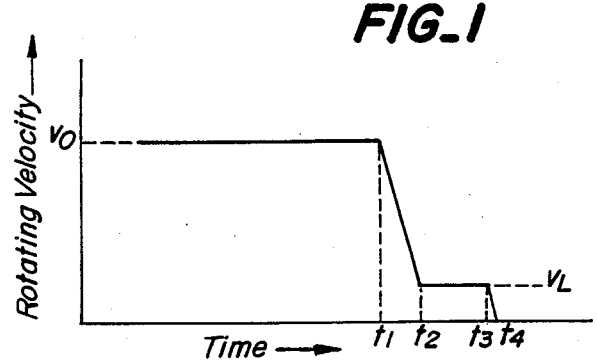
FIG. 1 is a graph showing a manner that the rotating velocity of tire changes in the conventional marking device.
Figure 2:
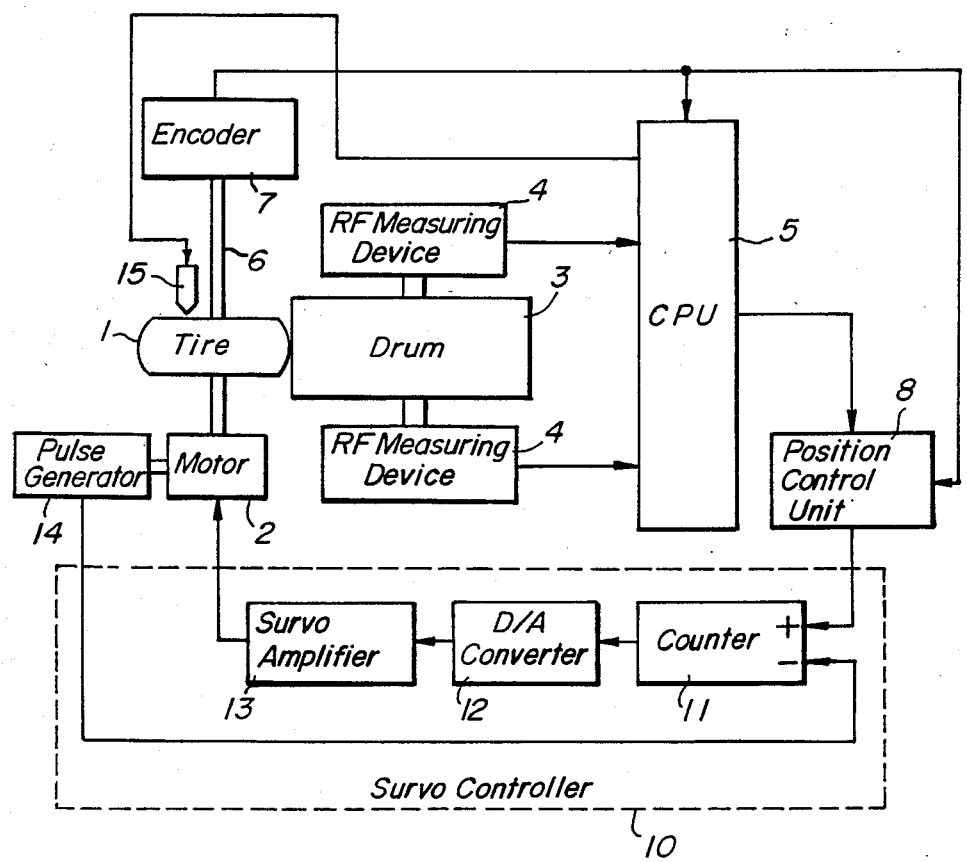
FIG. 2 is a block diagram showing the entire construction of an embodiment of the marking apparatus according to the present invention.

FIG. 2 is a block diagram showing the entire construction of an embodiment of the marking apparatus according to the present invention.

A tire 1 clamped on a standard rim is coupled with a rotating shaft 6 and is rotated by an electric motor 2, which is arranged at the end of said rotating shaft 6. In order to measure uniformity of the tire 1, the tire is urged against a drum 3 and the radial force generated on the tire 1 is measured by a pair of radial force measuring devices 4, 4 via the drum 3. The RF measured thereby is supplied to a central processing unit (CPU) 5. At another end of the rotating shaft 6, an encoder 7 is provided to produce one pulse every time the tire 1 has rotated by one round. This one-revolution pulse is supplied to the CPU 5 and a position control unit 8.

Figure 3A:
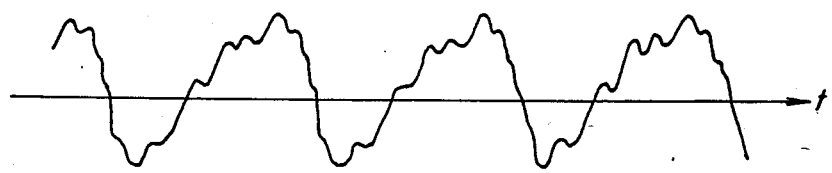
FIGS. 3A, 3B and 3C are waveforms for explaining the operation of the apparatus shown in FIG. 2.
Figure 3B:
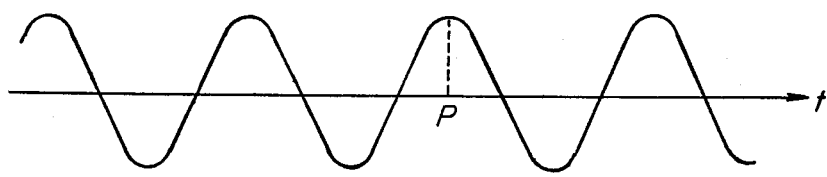
Figure 3C:

FIG. 3A is a waveform showing the radial force variation generated on the tire measured by the RF measuring devices, FIG. 3B is the primary waveform thereof, and FIG. 3C is a waveform showing said pulse detected by the encoder 7.

The CPU 5 receives the RFV signal of the tire shown in FIG. 3A generated from the RF measuring devices 4, 4 and the pulse produced by the encoder 7 shown in FIG. 3C. The CPU 5 first determines the primary waveform of the RFV of the tire by means of Fourier analysis and then detects a peak position of the primary waveform of RFV during each revolution of the tire. In order to mark a high point mark at the desired position on the sidewall of tire which corresponds to the peak point P of the primary waveform of RFV, a servo controller 10 for controlling the driving power of the electric motor 2 is provided This servo controller 10 comprises an up-down counter 11 for counting up first pulses supplied from the position control unit 8 under the control of CPU 5, a D/A converter 12 for converting the count value generated from said counter 11 to an analogue signal, a servo amplifier 13 for amplifying this output analogue signal supplied from the D/A converter 12 to output the DC voltage for driving the electric motor 2.

A pulse generator 14 is coupled with said electric motor 2 for detecting the rotating amount of the electric motor and generating feedback pulses (second pulses) in accordance with the rotating amount of the rotating shaft 6. The counter 11 is constructed so that the first pulses from the position controlling unit 8 are counted up and the second pulses from the pulse generator 14 are counted down to derive a count value corresponding to a difference between the number of the first and second pulses in order to control the rotation of the tire 1. The tire 1 is stopped at the desired position with the aid of the servo controller 10, and a high point mark can be recorded thereat by a marking device 15.

Figure 4:
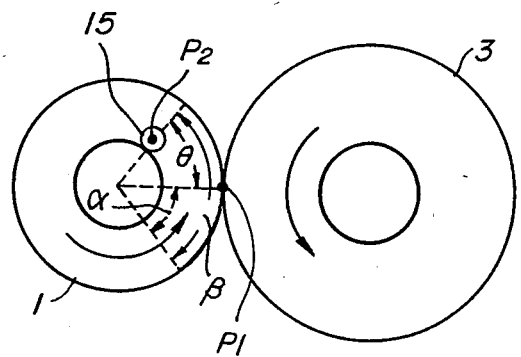
FIG. 4 is a schematic plan view showing the positional relationship among the tire, drum and marking device of the apparatus of FIG. 2.
Figure 5:
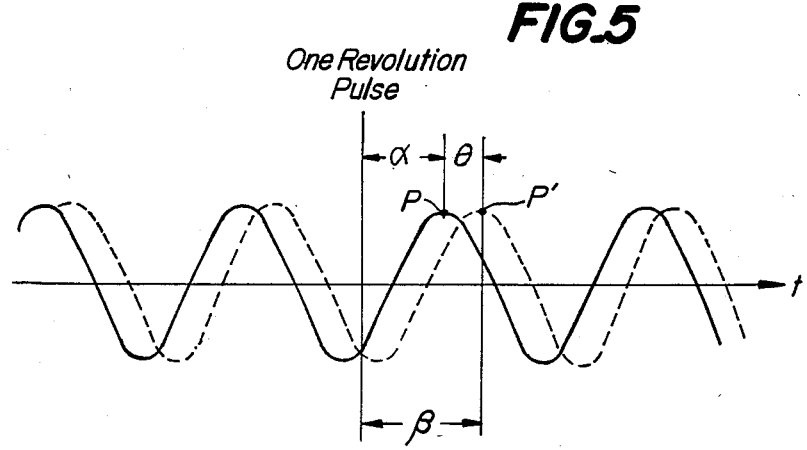
FIG. 5 is a waveform for explaining the method for correcting a deviation between the measuring position of the RFV and the marking position.

FIG. 4 is a schematic plan view showing a positional relation among the tire 1, the drum 3 and the marking device 15. In FIG. 4, the reference $P_1$ denotes a point at which the tread surface of the tire 1 contacts with the surface of the drum 3, and the reference $P_2$ is a marking point of the marking device 15. The angle $\theta$ formed by the contact point $P_1$ and the marking point $P_2$ is constant. The RF of the tire 1 is detected at the contact point $P_1$. In order to find a timing at which the rotating velocity of the tire has to be initiated, it is necessary to add the angle $\theta$ to an angle $\alpha$ over which the tire 1 must rotate from the time at which the one-revolution pulse is generated from the encoder 7 to the time at which the peak point P of RFV of the tire comes to the contact point $P_1$. That is to say, as shown in FIG. 5, which is a graph showing the primary waveform of RFV of the tire and a waveform shifted therefrom by the angle $\theta$, it is necessary to obtain a rotation angle $\beta(=\alpha+\theta)$ from the point at which the encoder 7 generates the one-revolution pulse to a peak point P' on the shifted waveform. If the tire 1 rotates by the angle 8 just after the one-revolution pulse is generated by the encoder 7, the peak point of the primary waveform of RFV would come to under the operation point $P_2$ of the marking device 15. Therefore, the tire is stopped at the timing when the tire 1 has just rotated by the angle $\beta$ after the one-revolution pulse was generated, so that the marking can be effected at the peak point of the primary waveform of RFV.

The angle $\beta$ is determined at CPU 5, and an output signal corresponding to the angle $\beta$ is supplied to the position control unit 8. At the position control unit, the number of first pulses corresponding to the angle $\beta$ is determined and these first pulses are supplied to the counter 11 in the servo controller 10 at a predetermined repetition frequency.

Figure 6:
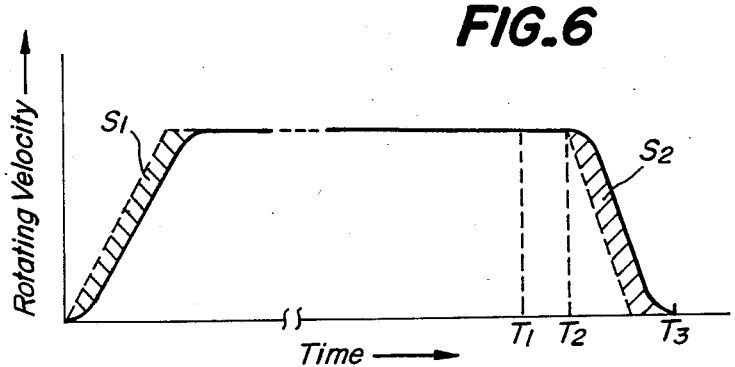
FIG. 6 is a graph showing a manner of changing the rotating velocity of tire in the marking apparatus according to the present invention.

FIG. 6 is a graph showing a manner that the rotating velocity of the tire varies, wherein the axis of abscissa represents a time and the axis of ordinates represents the rotating velocity of the tire 1. Before measuring the RFV of the tire, velocity data for the tire 1 is sent to the position control unit 8 via the CPU 5 to supply pulses having a constant repetition period to the counter 11. In the beginning, the rotating velocity of the tire 1 is slow, because the count value of the counter 11 is small. Thus, the repetition period of the second pulses supplied from the pulse generator (PG) 14 into the counter 11 is so long that the count value in the counter 11 increases gradually. The area $S_1$ shown in FIG. 6 corresponds to this increasing count value. As the count value in the counter 11 increases, the DC voltage to be given to the electric motor 2 increases. Therefore, the rotating velocity thereof also increases. When the rotating velocity of the electric motor 2 reaches to a predetermined value, the period (frequency) of the first pulses supplied from the position control unit 8 to the counter 11 becomes equal to the period (frequency) of the second pulses supplied from the PG 14 to the counter 11. Thereafter, the electric motor rotates at a constant velocity, for example, 60 rounds per minute, and the count value of the counter 11 becomes constant. In this manner, the tire 1 is rotated at the constant velocity to measure the RF of the tire, and the data of the RF of the tire is sent to the CPU 5. At the CPU 5, in which the data of RF has been given, a primary waveform of the RFV of the tire is obtained by processing the data of RF, said rotating angle $\alpha$ is determined and the rotating angle $\beta$ is obtained by adding the predetermined angle $\theta$ to the angle $\alpha$.

At the position control unit 8, the number of the first pulses N corresponding to the rotating angle $\beta$ is calculated. Further, as shown in FIG. 6, after the instant $T_1$ at which the pulse is produced by the encoder 7, the number of the first pulses in which the number of pulses corresponding to the area $S_1$ is subtracted from the number of pulses N, is supplied into the counter 11. At the time $T_2$, all the first pulses corresponding to the angle $\beta$ have been supplied to the counter 11, so that the count value of the counter 11 begins to gradually reduce due to the second pulses generated from the PG 14, and when the count value becomes zero, the electric motor stops its rotation. At this time $T_3$, the position on the sidewall of the tire corresponding to the peak point of the primary waveform of RFV of tire 1 comes just under the operating point $P_2$ of the marking device 15.

As apparent from FIG. 6, in order to operate the servo controller 10 effectively, it is necessary that the time period during which the tire 1 rotates by angle $\beta$ is longer than the time period of $(T_3-T_2)$. If this time period is shorter than $(T_3-T_2)$, the position control unit 8 has to supply first pulses the number of which corresponds to the angle $(\beta+360°)$ into the counter 11. In this case, the tire has to rotate one additional rotation, but since the tire is rotating at a high velocity of 60 rpm, it takes only one additional second. Therefore, the processing time for marking as a whole is not so influenced thereby.

The present invention is not limited to the above-mentioned embodiment but various modifications and alternations may be conceived by those skilled in the art within the scope of the invention. For instance, in the above-explained marking apparatus, if the contact point $P_1$ for measuring the RF Of the tire is the same as the marking point $P_2$, it is not necessary to add the angle $\theta$ to the angle $\alpha$.

In the above-mentioned embodiment, the one-revolution pulse is generated by the encoder 7, but any means may be used so long as it generates one pulse per one rotation of tire, since the reference point of the sidewall of tire can be arbitrarily determined.

In the marking apparatus according to the present invention, the rotating velocity of the electric motor for rotating the tire is controlled with the aid of the servo-controller, so that it is no more necessary to keep the rotating velocity low before the tire is actually stopped, but the rotation speed of tire can be reduced monotonously to zero. Therefore, the processing time period can be shortened by 3~5 seconds per one tire in comparison with the conventional marking apparatus.

Further, the rotation angle corresponding to one pulse of the pulses to be supplied to the counter can be made small, for example 0.1°. Since the position of tire to be stopped is controlled by this pulse, in the marking apparatus according to the present invention, the tire can be stopped without so large deviation from the desired stopping position.

What is claimed is:

1. An apparatus for making a high point mark on a sidewall of tire at a peak position of a primary waveform of a radial force variation (RFV) of the tire comprising:
    rotating means for rotating a tire;
    reference pulse generating means for generating a reference pulse in synchronism with the rotation of the tire;
    processing means for generating first pulses the number of which corresponds to an angle over which said tire must be rotated from an instant at which said reference pulse is generated by said reference pulse generating means to an instant at which the peak position of RFV thereof reaches a marking position;
    pulse generating means for generating second pulses whose repetition frequency is proportional to a rotational velocity of the tire as rotated by said rotating means;
    servo control means comprising a counter which initiates, in response to said reference pulse, a count of said first pulses supplied from said processing means and said second pulses supplied from said pulse generating means in an up and down counting manner to produce a difference count value therebetween, and a digital/analog converter for converting the difference count value produced by said counter to an analog signal by means of which said rotating means is controlled; and
    marking means for marking a high point mark at the peak position of RFV on the sidewall of the tire, said tire being stopped at the marking position when said difference count value of the counter becomes zero.

2. An apparatus according to claim 1, wherein said servo controlling means further comprises a servo amplifier for receiving said analog signal to generate a direct current voltage, and said rotating means comprises an electric direct current motor which is energized with said direct current voltage to rotate said tire.

3. An apparatus according to claim 2, wherein said processing means comprises an encoder for detecting a rotation of said tire to generate a one-revolution pulse every time the tire has rotated by one round and a central processing unit for processing the one-revolution pulse supplied from said encoder and the RFV of the tire and determining a primary waveform of the RFV of the tire and an angle 8 between the reference point which is related to said one-revolution pulse and said peak position of said primary waveform of RFV of said tire.

4. An apparatus according to claim 3, wherein said processing means further comprises a position control unit for determining the number of first pulses corresponding to said angle 8 on the basis of signals supplied from said central processing unit and said encoder.

5. An apparatus according to claim 4, wherein said position control unit sends to the counter a command of timing that said position control unit has to begin to supply said first pluses in accordance with said one-revolution pulse supplied from said encoder.

6. An apparatus according to claim 5, wherein said position control unit supplies said first pulses to said counter in such a manner that the repetition frequency of said first pulse is equal to that of said second pulses when a rotating velocity of said electric direct current motor becomes to be a predetermined constant velocity.

7. An apparatus according to claim 3, wherein said angle $\beta$ is determined by adding an angle $\alpha$ obtained from the reference position related to the one-revolution pulse and said peak position of the primary waveform of RFV of the tire to an angle $\theta$ which is predetermined by an operational position of said marking means and a contact position of said tire and a rotating drum in use for measuring said RFV.

* * * * *

UNITED STATES PATENT AND TRADEMARK OFFICE
CERTIFICATE OF CORRECTION

PATENT NO. : 4,907,447

DATED : March 13, 1990

INVENTOR(S) : Masami TANAKA and Masataka NAGASAWA

It is certified that error appears in the above-identified patent and that said Letters Patent is hereby corrected as shown below:

On the title page, item [73], change the Assignee from "NEC Corporation" to --Bridgestone Corporation--.

Signed and Sealed this

Seventh Day of April, 1992

*Attest:*

HARRY F. MANBECK, JR.

*Attesting Officer*      *Commissioner of Patents and Trademarks*